United States Patent [19]

Enomoto

[11] Patent Number: 5,320,985
[45] Date of Patent: Jun. 14, 1994

[54] LOW REFRACTIVE OPTICAL GLASS OF A FLINT GLASS TYPE

[75] Inventor: Goro Enomoto, Sagamihara, Japan

[73] Assignee: Kabushiki Kaisha Ohara, Kanagawa, Japan

[21] Appl. No.: 955,122

[22] Filed: Oct. 1, 1992

[51] Int. Cl.$^5$ .............................................. C03C 3/112
[52] U.S. Cl. ...................................... 501/57; 501/68; 501/69; 501/903
[58] Field of Search ................... 501/57, 58, 59, 69, 501/70, 903, 68

[56] References Cited

U.S. PATENT DOCUMENTS 3,877,953  4/1975  Broemer et al. ............... 501/903 X
4,562,161 12/1985  Mennemann et al. .......... 501/903 X
4,719,186  1/1988  Mennemann et al. .......... 501/903 X

FOREIGN PATENT DOCUMENTS 0009243  1/1981  Japan ..................................... 501/57
2106891  4/1983  United Kingdom ................ 501/903

*Primary Examiner*—Karl Group
*Attorney, Agent, or Firm*—Hedman, Gibson & Costitan

[57] ABSTRACT

An optical glass which is a $SiO_2$—$Nb_2O_5$—$R'_2O$ ($R'$ being an alkali metal element)-F system of a specific composition range exhibits optical constants of a refractive index (Nd) of about 1.60 or below and an Abbe number ($\nu$d) of about 57-40, is free of PbO and has an improved light transmissivity.

2 Claims, No Drawings

LOW REFRACTIVE OPTICAL GLASS OF A FLINT GLASS TYPE

BACKGROUND OF THE INVENTION

This invention relates to a low refractive flint glass type optical glass of a $SiO_2$—$Nb_2O_5$—$R'_2O$—F (where $R'$ is an alkali metal element) having optical constants of a refractive index (Nd) of about 1.60 or below and an Abbe number ($\nu d$) of about 57-40.

Known in the art are a variety of glasses having these optical constants. These glasses are of a relatively low refractive and low dispersion property in the property region of flint glasses and have been produced mostly as a $SiO_2$—PbO system glass. These glasses, however, have a serious drawback of containing a toxic PbO ingredient. For overcoming this drawback, the specification of U.S. Pat. No. 3,877,953 discloses a $SiO_2$—$B_2O_3$—$Nb_2O_5$—$K_2O$ system glass and the specification of U.S. Pat. No. 4,719,186 disclose a $SiO_2$—$B_2O_3$—$TiO_2$—$R'_2O$ system glass.

The proposed glasses having the above described optical constants, however, have the disadvantage that they are inferior in light transmissivity.

It is therefore an object of the present invention to eliminate the above described disadvantages of the prior art glasses and provide an optical glass which has optical constants of a refractive index (Nd) of about 1.60 or below and an Abbe number ($\nu d$) of about 57 to 40 and has improved light transmissivity.

SUMMARY OF THE INVENTION

Accumulated studies and experiments made by the inventor of the present invention for achieving the above described object of the invention have resulted in a finding, which has led to the present invention, that a stable glass can be obtained in a novel $SiO_2$—$Nb_2O_5$—$R'_2O$—F system glass which is substantially free of $B_2O_3$ and that a PbO-free optical glass which has the above described desired optical constants and is improved in light transmissivity can thereby be obtained.

The optical glass of a flint glass type achieving the above described object of the invention is characterized in that the glass comprises in weight percent:

| | |
|---|---|
| $SiO_2$ | 45–70% |
| $Al_2O_3$ | 0–20% |
| $Nb_2O_5$ + $TiO_2$ | 0.5–20% |
| in which $Nb_2O_5$ | 0.5–15% |
| $TiO_2$ | 0–15% |
| $ZrO_2$ | 0–10% |
| $Li_2O$ + $Na_2O$ + $K_2O$ | 15–40% |
| in which $Li_2O$ | 0–20% |
| $Na_2O$ | 0–40% |
| $K_2O$ | 0–40% |
| ZnO + MgO + CaO + SrO + BaO | 0–10% |
| in which BaO | 0–5% |
| and a fluoride or fluorides of a metal element or elements conatined in the above metal oxides, a total amount of F contained in the fluoride or fluorides | 0.1–8%. |

DETAILED DESCRIPTION OF THE INVENTION

In the optical glass made according to the invention, the above described content ranges of the respective ingredients have been selected for the reasons stated below. In the following description, the content range of the respective ingredients are expressed in weight percent.

The amount of $SiO_2$ which is a principal glass forming ingredient should be within the range of 45–70% for chemical durability and melting property of the glass. The $Al_2O_3$ ingredient may be added for adjusting optical constants and improving stability of the glass. If the amount of this ingredient exceeds 20%, the melting property decreases with resulting difficulty in obtaining a homogeneous glass.

The $Nb_2O_5$ ingredient is the most important ingredient for imparting desired optical constants to the glass of the present invention and besides is effective for improving chemical durability of the glass. For obtaining the expected results, it is necessary to add 0.5% or more $Nb_2O_5$. If the amount of this ingredient exceeds 15%, the manufacturing cost of the glass becomes excessively high. The $TiO_2$ ingredient has the same effect as the $Nb_2O_5$ ingredient and may be optionally added. The amount of this ingredient should be up to 15% because, if the amount exceeds 15%, the glass tends to become tinted. The total maximum amount of the $Nb_2O_5$ and $TiO_2$ ingredients should be 20% for preventing the glass from being tinted. For improving the chemical durability of the glass, the $ZrO_2$ ingredient may be added up to 10% which is a limit at which significant devitrification can be prevented.

The ingredients $Li_2O$, $Na_2O$ and $K_2O$ are effective for increasing the melting property of the glass and the ingredients $Na_2O$ and $K_2O$ are effective for lowering the refractive index, so that one or more of these ingredients should be added to the glass. For maintaining the chemical durability, the addition of $LiO_2$ should be up to 20%, the addition of $Na_2O$ should be in the range of 6 to 40% and $K_2O$ should be up to 40%.

The ZnO, MgO, CaO, SrO and BaO ingredients are effective for improving the melting property of the glass and one or more of these ingredients may be added. A total amount of one or more of these ingredients should be up to 10% for maintaining the target optical constants. For the same reason, the amount of the BaO ingredients should be up to 5%.

The fluorine (F) ingredient is an important ingredient for lowering the refractive index and improving light transmissivity of the glass. For achieving these effects, it is necessary to add 0.1% or more fluorine. The addition of fluorine, however, should not exceed 8% because otherwise striae would be produced in the glass and the quality of the glass would thereby be deteriorated.

As a defoaming agent, $Sb_2O_3$ or other known defoaming agent in the amount not exceeding 1% may be added to the glass of the present invention.

Table 1 shows examples of compositions (No. 1–No. 10) and comparative examples (No. A and No. B) of the prior art optical glasses as well as the refractive index (Nd), Abbe number ($\nu d$) and wavelengths of light in the unit of 10 nm producing light transmissivity of 80% and 5% in a specimen with two polished surfaces having thickness of 10 mm, i.e., $T_{80}/T_5$ (10 nm). These glasses were obtained by preparing and mixing selected raw materials such as oxides, carbonates, nitrates and fluorides and melting the mixture of the raw materials in a platinum crucible, stirring the mixture to homogenize it, casting it in a mold and annealing it.

In Table 1, the examples of the optical glasses according to the present invention all exhibit optical constants within the predetermined region and smaller values of $T_{80}$ and $T_5$ than the glasses of the comparative examples having equivalent optical constants, which indicates that the wavelength of light is shifted substantially toward the short wavelength side, so that light transmissivity is remarkably improved. Moreover, the glasses of the examples of the present invention have good chemical durability. Furthermore, these glasses have excellent melting property and property against devitrification and have a low softening temperature and, accordingly, are easy to manufacture.

TABLE 1

(in weight %)

| No. | Examples | | | | | | | | A | B |
|---|---|---|---|---|---|---|---|---|---|---|
|  | 1 | 2 | 3 | 4 | 5 | 6 | 7 | 8 | | |
| $SiO_2$ | 60.8 | 58.4 | 48.0 | 51.3 | 45.0 | 54.9 | 65.5 | 58.0 | 28.5 | 60.0 |
| $B_2O_3$ |  |  |  |  |  |  |  |  | 10.5 | 6.6 |
| $Al_2O_3$ |  |  | 5.0 |  | 12.0 |  |  |  |  | 1.7 |
| $Nb_2O_5$ | 2.0 | 7.0 | 1.0 | 2.0 | 1.0 | 2.0 | 2.0 | 12.0 | 10.0 |  |
| $TiO_2$ | 9.5 | 1.5 | 5.0 | 12.0 | 5.0 |  | 1.0 | 5.0 |  | 9.9 |
| $ZrO_2$ |  |  |  |  |  | 8.0 |  |  |  | 0.5 |
| ZnO | 2.5 | 5.0 |  |  |  |  |  |  |  | 0.2 |
| MgO |  |  |  |  |  | 5.0 |  |  |  |  |
| CaO |  |  |  |  |  |  | 5.0 |  |  |  |
| SrO |  |  |  |  |  |  |  |  |  |  |
| BaO | 2.5 |  |  |  |  |  |  |  |  | 8.0 |
| $Li_2O$ | 5.0 |  |  |  |  |  |  |  |  | 5.6 |
| $Na_2O$ | 7.5 | 15.5 | 36.0 | 10.0 | 30.0 | 15.0 | 10.0 | 6.0 |  |  |
| $K_2O$ | 7.5 | 10.0 |  | 17.0 |  | 10.0 | 15.0 | 15.0 | 21.0 | 7.0 |
| $AlF_3$ |  |  | 5.0 |  | 7.0 | 5.0 |  |  |  |  |
| $K_2TiF_6$ |  |  |  |  |  |  |  |  | 30.0 |  |
| NaF |  |  |  |  |  |  |  |  |  | 0.5 |
| KF | 2.5 | 2.5 |  | 7.5 |  |  | 1.5 | 4.0 |  |  |
| (F) | (0.8) | (0.8) | (3.4) | (2.4) | (4.8) | (3.4) | (0.5) | (1.3) | (15.5) | (0.2) |
| $Sb_2O_3$ | 0.2 | 0.1 |  | 0.2 |  | 0.1 |  |  |  |  |
| Nd | 1.5714 | 1.5377 | 1.5236 | 1.5534 | 1.5202 | 1.5247 | 1.5142 | 1.5572 | 1.5886 | 1.5789 |
| $\sqrt{d}$ | 45.5 | 52.0 | 49.1 | 44.5 | 50.9 | 55.3 | 56.0 | 46.5 | 39.2 | 46.4 |
| $T_{80}/T_5$ (10 nm) | 35/33 | 34/32 | 35/33 | 35/33 | 34/32 | 34/32 | 34/32 | 35/32 | 37/34 | 38/35 |

What is claimed is:

1. A low refractive optical flint glass which consists essentially of in weight percent:

| $SiO_2$ | 45-70% |
|---|---|
| $Al_2O_3$ | 0-20% |
| $Nb_2O_5 + TiO_2$ | 0.5-20% |
| in which $Nb_2O_5$ | 0.5-15% |
| $TiO_2$ | 0-15% |
| $ZrO_2$ | 0-10% |
| $Li_2O + Na_2O + K_2O$ | 15-40% |
| in which $Li_2O$ | 0-20% |
| $Na_2O$ | 0-40% |
| $K_2O$ | 0-40% |
| $ZnO + MgO + CaO + SrO + BaO$ | 0-10% |
| in which BaO | 0-5% | and a fluoride or fluorides of a metal element or elements contained in the above metal oxides, a total amount of F contained in the fluoride or fluorides is 0.1-8%.

2. A low refractive optical flint glass which consists essentially of in weight percent:

| $SiO_2$ | 45-70% |
|---|---|
| $Al_2O_3$ | 0-20% |
| $Nb_2O_5 + TiO_2$ | 0.5-20% |
| in which $Nb_2O_5$ | 0.5-15% |
| $TiO_2$ | 0-15% |
| $ZrO_2$ | 0-10% |
| $Li_2O + Na_2O + K_2O$ | 15-40% |
| in which $Li_2O$ | 0-20% |
| $Na_2O$ | 6-40% |
| $K_2O$ | 0-40% |
| $ZnO + MgO + CaO + SrO + BaO$ | 0-10% |
| in which BaO | 0-5% | and a fluoride or fluorides of a metal element or elements contained in the above metal oxides, a total amount of F contained in the fluoride or fluorides is 0.1-8%.

* * * * *